United States Patent [19]

D'Annunzio

[11] Patent Number: 5,006,389

[45] Date of Patent: Apr. 9, 1991

[54] ERASABLE XEROGRAPHIC VELLUM

[75] Inventor: Joseph C. D'Annunzio, Barrington, Ill.

[73] Assignee: Teledyne Industries, Inc., Los Angeles, Calif.

[21] Appl. No.: 559,363

[22] Filed: Jul. 30, 1990

[51] Int. Cl.[5] ..................... B32B 9/00

[52] U.S. Cl. ..................... 428/76; 428/195; 428/211; 428/537.5

[58] Field of Search ..................... 428/195, 537.5, 76, 428/211

[56] References Cited

U.S. PATENT DOCUMENTS

| | | | |
|---|---|---|---|
| 2,812,252 | 11/1957 | Baymiller | 92/3 |
| 3,923,518 | 12/1975 | Muller | 96/75 |
| 4,100,329 | 7/1978 | Neithardt | 428/413 |
| 4,271,227 | 6/1981 | Muller et al. | 428/264 |
| 4,569,888 | 2/1986 | Muller et al. | 428/482 |
| 4,872,777 | 10/1989 | Dalbke | 95/424 |
| 4,892,787 | 1/1990 | Kruse et al. | 428/331 |
| 4,901,704 | 8/1975 | Takimoto et al. | 430/69 |

FOREIGN PATENT DOCUMENTS

| | | |
|---|---|---|
| 1329835 | 9/1973 | United Kingdom . |

*Primary Examiner*—Patrick J. Ryan

*Attorney, Agent, or Firm*—Lockwood, Alex, FitzGibbon & Cummings

[57] ABSTRACT

An erasable vellum adapted for imaging in xerographic copiers since it is free of volatile oil and organic solvent conventionally used for transparentizing fibrous cellulosic substrates. The erasable vellum is produced from a rag pulp paper transparentized by a polybutene emulsion, preferably incorporated in the pulp during the papermaking process. The transparentized paper substrate is given a barrier coating of an aqueous emulsion of styrene-butadiene and an overcoating of a vinyl acetate co-polymer, preferably vinyl acrylic-vinyl acetate. If desired, calcium carbonate and blue tint may be included in the substrate and a minor proportion of precipitated silicone dioxide may be included in the overcoat.

10 Claims, No Drawings

ERASABLE XEROGRAPHIC VELLUM

This invention relates to improvements and innovations in vellums which are particularly suited for being imaged or reproduced in Xerographic copiers with the resulting heat-fixed toner images being erasable or correctable.

Translucent vellum products have long been of importance to the reprographic and engineering fields. Historically, engineering drawings have been prepared on a translucent medium so they could be copied by the blueprint (diazo) process, using transmitted ultraviolet light. The term "vellum" is the designation for a rag-base paper, usually 100% rag, which traditionally has been impregnated with oils or resins to render it translucent, the process being referred to as "transparentizing".

In the early production of vellums, they were rendered translucent by the application of oil to the fibrous cellulosic sheets. Paper thus treated could then be used to make a tracing of an original drawing. Later on, as blueprint technology was developed, the tracings were used as the originals to make blueprints. Later still, the same tracings could be used as originals to make diazo whiteprints. And finally, as newer technologies emerged, translucent vellums could be used to make plotter or xerographic copies, which again could be used as diazo whiteprint originals.

The vellums which were transparentized solely with oil suffered several problems. First, the oil being mobile it could wipe off the vellum or migrate into adjacent materials. Second, papers transparentized with oil did not accept drafting inks very well. For these reasons, newer methods of transparentizing vellum were developed. Various resins, such as poly-styrene or poly-isobutylene, were dissolved in organic solvents, either with or without oil, and were imbibed into the vellum base or substrate. Subsequently the vellum base or substrate was dried to remove the solvent, resulting in an improved translucent sheet. Vellum sheets thus transparentized were cleaner, had improved drafting characteristics, were stronger, and if oil was used in conjunction with a resin, it was immobilized to overcome its migratory tendencies.

However, it was not easy to make corrections or erasures on drawings or prints made on vellums transparentized with oil alone or with oil in combination with resin. Ink lines, toner images, etc., were not erasable because the image, when formed, was partially down in the fiber of the base or substrate. Hence, coatings which would render the vellums erasable or correctable were developed. By coating the vellums with a layer of soft rubbery resin, such as styrene, butadiene or soft acrylic, an erasable surface could be created. This erasable "barrier" layer was usually coated out of organic solvents, but could also be coated out of a water-base emulsion of the resins. To improve the surface of the erasable layer for drafting or imaging, various silicas or other materials were added to the coating formulation, or a subsequent imaging/drafting layer was overcoated on top of the erasable barrier layer. Such an overcoat layer would usually be a harder resin, such as a hard acrylic, with various silicas selected and incorporated to improve imaging and drafting properties. Such an overcoat layer could be applied with either a solvent or an aqueous emulsion. The advantage of overcoating was to provide a superior imaging layer with a reduced "blocking" tendency (i.e. the sticking together of sheets into one mass) which occurred with non-overcoated erasable vellums.

However, erasable vellums available commercially suffered from a common problem in that they all retained organic solvent incorporated during the transparentizing process. Despite repeated drying, odor detectable organic solvents remained in the vellum sheets. Toluene, one of the solvents commonly used in transparentizing/coating operations is extremely difficult to remove from paper for steric reasons. Other solvents, such as heptane, also remain in detectable quantities. For this reason, much effort has been expended to develop solvent-free vellum products.

Accordingly, the object of the present invention, generally stated, is the provision of solvent and oil free erasable vellums which are suitable for imaging or reproduction in Xerographic copiers.

For a full understanding of the nature and scope of the invention, reference may be had to the following detailed description in which preferred working embodiments of the invention are set forth as illustrative examples.

GENERAL DESCRIPTION

Rag-based papers are used as the substrate in practicing the present invention. Preferably, papers produced from pulps containing 100% rag fibers are utilized. The paper sheets or substrates are transparentized using aqueous emulsions of the same resins previously used in transparentizing with organic solvents, e.g. a polybutene emulsion. Preferably, the aqueous emulsions are added to the pulp at the time the paper is formed. The resulting solvent-free and oil-free transparentized base or substrate can be coated with aqueous emulsions of various barrier resins such as styrene-butadiene emulsion. After a barrier coating has been applied and dried, the sheets are rendered readily erasable and correctable by applying and drying an overcoat or top-coat of a vinyl acetate co-polymer emulsion.

SPECIFIC EXAMPLE

A solvent free and oil-free vellum substrate or sheet was prepared from a 100% rag pulp in which polybutene emulsion was incorporated as a transparentizing agent. Such vellum substrates or sheets were coated with a barrier coating having the following formulation:

| | 100 g |
|---|---|
| Water | 88.0 g |
| Ammonium Hydroxide (26° Be) | 0.5 g |
| Goodyear 6687 (Styrene-butadiene emulsion) | 11.5 g |

The barrier coating was applied using Mayer Rod technology common to the reprographic industry. After the barrier coating was dried, it was overcoated with a top coat having the following formulation:

| | 100 g |
|---|---|
| Water | 82.0 g |
| Andrews 2820 (precipitated silicon dioxide) | 6.0 g |
| Ammonium Hydroxide (26° Be) | 1.0 g |

-continued

| | |
|---|---|
| Union Res 6237 (vinyl acrylic - vinyl acetate emulsion) | 11.0 g |

The overcoated vellum sheets were dried and then imaged in a xerographic copier. The images thus produced were readily erasable, both by hand and with an erasing machine and were correctable.

Those skilled in the art will be able to make changes in the foregoing example without departing from the invention as claimed.

What is claimed is:

1. An oil and organic solvent free erasable vellum comprising, a fibrous cellulosic substrate transparentized in the absence of oil and organic solvent by incorporation of a polybutene emulsion, a dried barrier coating of an aqueous emulsion of styrene-butadiene, and a dried top coat of vinyl acetate co-polymer emulsion.

2. The vellum of claim 1 wherein the fibrous cellulosic substrate is 100% rag paper and the polybutene emulsion is dispersed into the pulp from which the substrate is made.

3. The vellum of claim 2 wherein a minor proportion of calcium carbonate is dispersed into said pulp.

4. The vellum of claim 1 wherein said top coat is a dried coating of vinyl acrylic-vinyl acetate emulsion.

5. The vellum of claim 4 wherein said top coat contains a minor content of precipitated silicone dioxide.

6. An oil and solvent-free erasable vellum comprising a fibrous cellulosic substrate formed from a 100% rag pulp and a transparentizing content of a polybutene emulsion, a dried barrier coating on said substrate formed from a styrene-butadiene emulsion containing a minor amount of ammonium hydroxide, and a dried top coat formed from vinyl acrylic-vinyl acetate emulsion containing minor contents of precipitated silicone dioxide and ammonium hydroxide.

7. An oil and solvent-free erasable vellum as called for in claim 6 wherein said dried barrier coating was formed from the following in parts by weight:

| | |
|---|---|
| Water | 88.0 parts |
| Ammonium Hydroxide (26° Be) | 0.5 parts |
| Styrene-butadiene emulsion | 11.5 parts |

and said dried top coat was formed from the following in parts by weight:

| | |
|---|---|
| Water | 82 parts |
| Precipitated silicon dioxide | 6 parts |
| Ammonium Hydroxide (26° Be) | 1 part |
| Vinyl acrylic-vinyl acetate emulsion | 11 parts |

8. The method of making oil and solvent-free erasable vellum which comprises, coating a fibrous cellulosic substrate transparentized in the absence of oil and organic solvent by incorporation of a polybutene emulsion with a barrier coating of an aqueous emulsion of styrene-butadiene and drying the same, and coating said dried barrier coating with a top coating of vinyl acetate co-polymer emulsion and drying the same.

9. The method of claim 8 wherein said fibrous cellulosic substrate is formed from 100% rag pulp and a transparentizing quantity of polybutene emulsion.

10. The method of claim 8 wherein said top coating is an aqueous emulsion of vinyl acrylic-vinyl acetate emulsion.

* * * * *